United States Patent
Patil et al.

(10) Patent No.: US 9,161,376 B2
(45) Date of Patent: Oct. 13, 2015

(54) SYSTEM AND METHOD FOR MANAGING ACCESS POINT COMMUNICATION CHANNEL UTILIZATION

(71) Applicant: CISCO TECHNOLOGY, INC., San Jose, CA (US)

(72) Inventors: Santosh Ramrao Patil, Bangalore (IN); Sandesh Goel, Noida (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 13/971,549

(22) Filed: Aug. 20, 2013

(65) Prior Publication Data

US 2015/0055490 A1    Feb. 26, 2015

(51) Int. Cl.
*H04B 3/46* (2015.01)
*H04W 76/02* (2009.01)
*H04W 24/08* (2009.01)
*H04W 24/00* (2009.01)
*H04W 28/02* (2009.01)
*H04W 92/12* (2009.01)

(52) U.S. Cl.
CPC .............. *H04W 76/02* (2013.01); *H04W 24/00* (2013.01); *H04W 24/08* (2013.01); *H04W 28/02* (2013.01); *H04W 92/12* (2013.01)

(58) Field of Classification Search
CPC ..... H04W 24/08; H04W 24/00; H04W 88/08; H04L 12/2602; H04L 41/147
USPC ........................................... 375/224; 370/252
See application file for complete search history.

(56) References Cited

U.S. PATENT DOCUMENTS

| | | | |
|---|---|---|---|
| 2005/0058095 A1* | 3/2005 | Sadri et al. | 370/329 |
| 2006/0109894 A1* | 5/2006 | Liang et al. | 375/222 |
| 2008/0019293 A1* | 1/2008 | Chang et al. | 370/310 |
| 2009/0207819 A1* | 8/2009 | Kroselberg et al. | 370/338 |
| 2009/0274059 A1* | 11/2009 | Xing et al. | 370/252 |
| 2009/0275319 A1* | 11/2009 | Aoyama et al. | 455/418 |
| 2010/0144359 A1* | 6/2010 | Song et al. | 455/450 |
| 2010/0246496 A1* | 9/2010 | Yurugi et al. | 370/328 |
| 2010/0284693 A1* | 11/2010 | Agmon et al. | 398/65 |
| 2012/0026865 A1* | 2/2012 | Fan et al. | 370/225 |

OTHER PUBLICATIONS

Hadi Hariyanto, et al., "Backhaul-aware Scheduling for WiMAX Femtocell with Limited Backhaul Capacity," TENCON 2011, IEEE Region 10 Conference, Nov. 21-24, 2011, ISSN 2159-3442; pp. 1280-1284.

* cited by examiner

*Primary Examiner* — Leila Malek
(74) *Attorney, Agent, or Firm* — Patent Capital Group

(57) ABSTRACT

A method is provided in one example and includes determining that at least one performance characteristic of a broadband communication channel between an access point and a gateway and managing access point communication channel utilization based, at least in part, on the performance characteristic. In one or more example embodiments, the access point communication channel utilization pertains to the broadband communication channel, at least one user equipment communication channel, and/or the like.

17 Claims, 12 Drawing Sheets

SYSTEM AND METHOD FOR MANAGING ACCESS POINT COMMUNICATION CHANNEL UTILIZATION

TECHNICAL FIELD

This disclosure relates in general to the field of communications and, more particularly, to managing access point communication channel utilization.

BACKGROUND

Femtocell deployment often depends on a connection between a femtocell access point and a core node. Generally, the quality of the connection varies among femtocell users based on a variety of factors, including location, network congestion, internet service provider, and/or the like. In some cases, the connection provided to the femtocell access point is shared with other user equipment, which may further degrade the quality of the connection for femtocell-related services such as voice services and data services.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
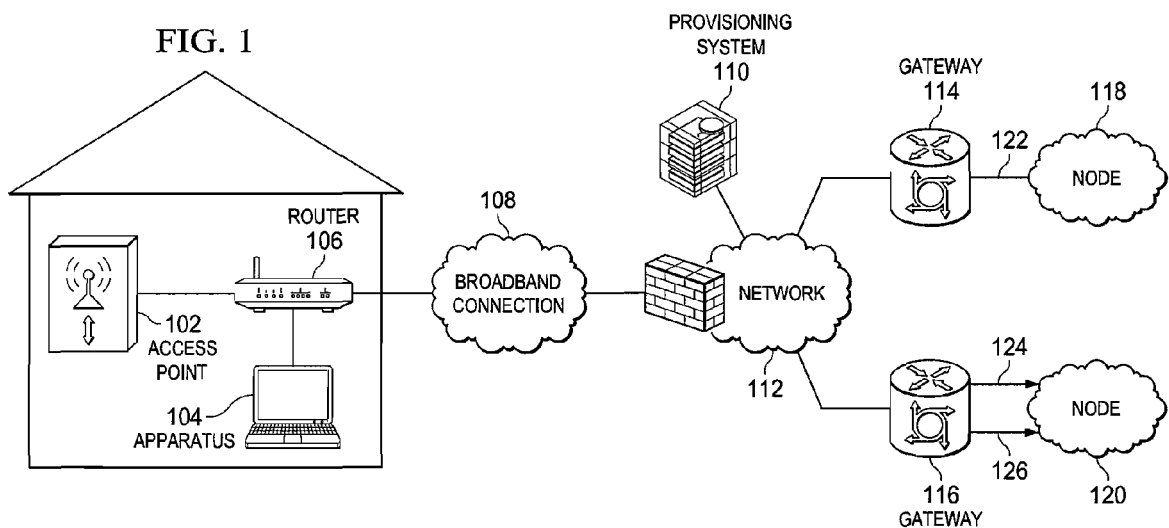
FIG. 1 is a simplified illustration showing a system for providing a femtocell network according to an example embodiment.

One or more embodiments may provide an apparatus, a computer readable medium, a non-transitory computer readable medium, a computer program product, and a method for determining that at least one performance characteristic of a broadband communication channel between an access point and a gateway and managing access point communication channel utilization based, at least in part, on the performance characteristic. In one or more example embodiments, the access point communication channel utilization pertains to the broadband communication channel, at least one user equipment communication channel, and/or the like.

One or more embodiments may provide an apparatus, a computer readable medium, a computer program product, and a non-transitory computer readable medium having means for determining that at least one performance characteristic of a broadband communication channel between an access point and a gateway and means for managing access point communication channel utilization based, at least in part, on the performance characteristic. In one or more example embodiments, the access point communication channel utilization pertains to the broadband communication channel, at least one user equipment communication channel, and/or the like.

In at least one example embodiment, the performance characteristic relates to a characteristic associated with transmission of data. In at least one example embodiment, the performance characteristic relates to connection quality. In at least one example embodiment, the connection quality relates to at least one of network latency, speed, bandwidth, jitter, or packet loss. In at least one example embodiment, the broadband communication channel relates to an internet service provider communication channel. In at least one example embodiment, the internet service provider communication channel relates to an internet service provider communication network.

In at least one example embodiment, the internet service provider communication channel comprises a communication channel that is comprised by the internet service provider communication network. In at least one example embodiment, the performance characteristic of the broadband communication channel varies with respect to at least one of time or instances. In at least one example embodiment, the access point relates to an apparatus that providers for communication between a user equipment and the gateway by way of the user equipment communication channel and the broadband communication channel. In at least one example embodiment, the access point relates to a femtocell access point and the user equipment communication channel relates to a cellular communication channel.

In at least one example embodiment, the gateway relates to a network node equipped for interfacing with another network that uses a different communication protocol than a communication protocol of the broadband communication channel. In at least one example embodiment, the user equipment communication channel relates to a cellular communication channel and the different communication protocol relates to a cellular network communication protocol associated with the cellular communication channel.

In at least one example embodiment, the gateway relates to at least one of a home node b gateway or a home evolved node b gateway. In at least one example embodiment, the determination of the performance characteristic comprises communicating with a test server and measuring at least one test communication characteristic and the performance characteristic is based, at least in part, on the test communication characteristic.

In at least one example embodiment, the test server relates to a network node equipped for determining the performance characteristic. In at least one example embodiment, the managing of access point communication channel utilization relates to controlling the manner in which the access point utilizes at least one of the user equipment communication channel or the broadband communication channel.

In at least one example embodiment, the managing of access point communication channel utilization of the broadband communication channel relates to controlling at least one parameter associated with the broadband communication channel. In at least one example embodiment, the parameters associated with the broadband communication channel relate to at least one of a gateway communication parameter or a transmission parameter.

In at least one example embodiment, the managing of access point communication channel utilization of the broadband communication channel comprises causation of communication of at least one setting indicating a value of at least one parameter associated with the broadband communication channel. In at least one example embodiment, the causation of communication of the setting comprises sending the setting to at least one of the gateway or a provisioning system. In at least one example embodiment, the provisioning system relates to a home node b management system. In at least one example embodiment, the home node b management system relates to a femtocell provisioning gateway.

In at least one example embodiment, the managing of access point communication channel utilization of the user equipment communication channel relates to controlling at least one parameter associated with the user equipment communication channel. In at least one example embodiment, the parameters associated with the user equipment communication channel relate to at least one of a bearer communication parameter or a transmission parameter.

In at least one example embodiment, the managing of access point communication channel utilization of the user equipment communication channel relates to controlling allocation of at least one access point resource with respect to user equipment associated with the user equipment communication channel. In at least one example embodiment, the controlling of allocation of the access point resource relates to an allocation determination regarding a bearer channel between the user equipment and the access point. In at least one example embodiment, the allocation determination relates to at least one of a determination to allocate or a determination to preclude allocation. In at least one example embodiment, the allocation determination is based, at least in part, on the performance characteristic.

In at least one example embodiment, the allocation determination is based, at least in part, on an allocation of a different bearer channel to a different user equipment. In at least one example embodiment, a communication characteristic associated with the different bearer channel exceeds a communication characteristic associated with the bearer channel and further comprising causing modification of the different bearer channel. In at least one example embodiment, the modification of the different bearer channel comprises causation of initiation of a handoff associated with the different bearer channel with a different access point.

In at least one example embodiment, the modification of the different bearer channel comprises causation of a downgrade of the different bearer channel. In at least one example embodiment, the downgrade of the different bearer channel relates to changing the bearer type of the different bearer channel such that the communication characteristic associated with the different bearer channel is reduced. In at least one example embodiment, the modification of the different bearer channel comprises causation of termination of the different bearer channel. In at least one example embodiment, the allocation determination relates to the determination to preclude allocation and further comprising initiation of a handoff with a different access point.

In at least one example embodiment, the handoff relates to allocation of the bearer channel by the different access point. In at least one example embodiment, the allocation determination relates to the determination to preclude allocation and further comprising causing communication of a rejection of allocation of the bearer channel. One or more example embodiments further perform receipt of an allocation request for allocation of the access point resource. In at least one example embodiment, the allocation determination relates to the determination to allocate and further comprising causation of allocation of the bearer channel. In at least one example embodiment, the bearer channel relates to an emergency call and the determination to allocate is based, at least in part, on the emergency call. In at least one example embodiment, the allocation of the bearer channel comprises determination of a bearer type based, at least in part, on the performance characteristic. In at least one example embodiment, the bearer type is based, at least in part, on an allocation of a different bearer channel to a different user equipment.

Example Embodiments

Some embodiments will now be described more fully hereinafter with reference to the accompanying drawings, in which some, but not all, embodiments are shown. Various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a simplified illustration showing a system for providing a femtocell network according to an example embodiment. The example of FIG. 1 is merely an example and does not limit the scope of the claims. In certain circumstances, a user may experience wireless call quality issues due to local geography, wireless signal interference, building impediments, and/or the like. In such circumstances, it may be desirable to deploy an access point. In at least one example embodiment, an access point relates to an apparatus that provides for communication between user equipment and a gateway by way of a user equipment communication channel and a broadband communication channel. In one or more example embodiments, an access point relates to a femtocell access point, a home node b access point, and/or the like. User equipment may relate to a phone, a tablet, a laptop, equipment capable of communicating via a cellular communication channel, and/or the like. In at least one example embodiment, an access point relates to a femtocell access point and a user equipment communication channel relates to a cellular communication channel. A user equipment communication channel may, for example, relate to a universal mobile telecommunications system communication channel, long-term evolution communication channel, and/or the like. In one or more example embodiments, a gateway relates to a network node equipped for interfacing with another network that uses a different communication protocol than a communication protocol of a broadband communication channel. For example, the broadband communication channel may relate to a broadband communication protocol and the different communication protocol may relate to a cellular network communication protocol associated with a cellular communication channel. In such an example, the gateway allows for interfacing of and communication between the broadband communication channel and the cellular communication channel. In at least one example embodiment, a gateway relates to a home node b gateway, a home evolved node b gateway, and/or the like. A broadband communication channel may, for example, relate to a digital subscriber line communication channel, a cable internet communication channel, and/or the like. In at least one example embodiment, a broadband communication channel relates to an internet service provider communication channel. In one or more example embodiments, an internet service provider communication channel relates to an internet service provider communication network. For example, the internet service provider communication channel may relate to a communication channel that is comprised by the internet service provider communication network.

In certain circumstances, a user may desire to associate a performance characteristic with a broadband communication channel. For example, in order to better understand bandwidth and/or capacity of the broadband communication channel, the user may desire to quantify some performance characteristic associated with the broadband communication channel. In at least one example embodiment, a performance characteristic relates to a characteristic associated with transmission of data via a broadband communication channel. In one or more example embodiments, a performance characteristic relates to connection quality, backhaul quality, and/or the like. For example, connection quality may relate to network latency, speed, bandwidth, jitter, or packet loss. Further, connection quality may relate to uplink connection quality, downlink connection quality, and/or the like. In one or more example embodiments, a performance characteristic of a broadband communication channel may vary with respect to time, instance, and/or the like. For example, the performance characteristic of the broadband communication channel may vary depending on overall broadband communication channel congestion, internet service provider communication network congestion, environmental factors, and/or the like.

In certain circumstances, variation in a performance characteristic associated with a broadband communication channel may have considerable impact on user experience related to use of user equipment and an access point connected to a gateway via the broadband communication channel. For example, quality of service allocated to a data or voice session may fail to take into consideration the performance characteristic of the broadband communication channel. In such an example, a broadband communication channel associated with a poor performance characteristic may be incapable of providing the allocated quality of service. Additionally, a broadband communication channel associated with a poor performance characteristic may be associated with a greater call drop rate and/or packet loss rate based, at least in part, on delay in data and/or control plane traffic between an access point and a gateway. Further, due to said possible delay in control plane traffic, a call establishment success rate may be negatively affected. For example, a decrease in the call establish success rate may be based, at least in part, on a broadband communication channel associated with a poor performance characteristic causing a delay in data communication such that session establishment times out based, at least in part, on a preconfigured call establishment timeout value at a gateway.

In certain circumstances, it may be desirable to manage access point provisioning and/or deployment. For example, it may be desirable for a provisioning system to manage access point deployment and/or access point communication with a gateway. In at least one example embodiment, a provisioning system relates to a home node b management system. In such an example embodiment, the home node b management system may relate to a femtocell provisioning gateway. A provisioning system may, for example, relate to a network element management system for home node b access. In such an example, the provisioning system may facilitate gateway discovery for an access point, provision configuration data to an access point, perform location verification of an access point, and/or the like. A provisioning system may relate to a server, a group of servers, and/or the like.

The system illustrated in FIG. 1 comprises access point 102, other user equipment 104, router 106, communication channel 108, network 112, provisioning system 110, gateway 114, gateway 116, node 118, node 120, communication channel 122, communication channel 124, and communication channel 126. In the example of FIG. 1, access point 102 relates to a femtocell access point, a home node b access point, and/or the like. In the particular illustrated embodiment, access point 102 is in communication with router 106 via a wired connection, a wireless connection, and/or the like. In the example of FIG. 1, router 106 relates to a router, a switch, a modem, and/or the like. Access point 102 is in further communication with network 112 via communication channel 108 and router 106. Communication channel 108 may relate to a broadband communication channel, an internet service provider communication channel, and/or the like. Network 112 may relate to a local area network, a wide area network, and/or the like. Access point 102 is in further communication with provisioning system 110, gateway 114, and gateway 116 via network 112. In the example of FIG. 1, provisioning system 110 relates to a femtocell provisioning system. Gateway 114 relates to a home evolved node b gateway. Gateway 116 relates to a home node b gateway. Gateway 114 is in communication with node 118 via communication channel 122. In the example of FIG. 1, node 118 may relate to a serving gateway, a packet data network gateway, and/or the like. Gateway 116 is in communication with node 120 via communication channel 124 and communication channel 126. In the example of FIG. 1, node 120 may relate to a mobile switching center, a gateway general packet radio service support node, and/or the like. Communication channel 124 relates to a circuit switched core network interface. Communication channel 126 relates to a packet switched core network interface.

Figure 2:
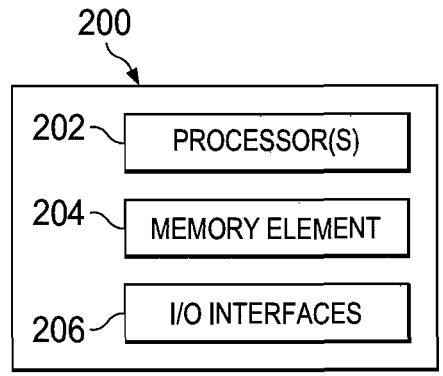
FIG. 2 is a simplified block diagram showing an apparatus according to an example embodiment.

FIG. 2 is a simplified block diagram showing an apparatus according to an example embodiment. The example of FIG. 2 is merely an example and does not limit the scope of the claims. For example, may vary, may vary, may vary, and/or the like.

In one implementation, access point 200 is a network element that includes software to achieve (or to foster) establishment of a call session associated with a user equipment and a gateway, as described in this Specification. In at least one example embodiment, each of these elements may have an internal structure (e.g., a processor, a memory element, etc.) to facilitate some of the operations described herein. In one or more example embodiments, these operations may be executed externally to this element, or included in some other network element to achieve this intended functionality. Alternatively, access point 200 may include software (or reciprocating software) that may coordinate with other network elements in order to achieve the operations, as outlined herein. In at least one example embodiment, one or several devices may include any suitable algorithms, hardware, software, components, modules, interfaces, or objects that facilitate the operations thereof.

FIG. 2 is a simplified block diagram showing an apparatus according to an example embodiment. In the example of FIG. 2, access point 200 includes processor(s) 202, memory element 204, and input/output (I/O) interface(s) 206. Processor(s) 202 is configured to execute various tasks of access point 200 as described herein and memory element 204 is configured to store data associated with access point 200. I/O interface(s) 206 is configured to receive communications from and send communications to other devices, user equipment, servers, software modules, and/or the like.

Figure 3A:
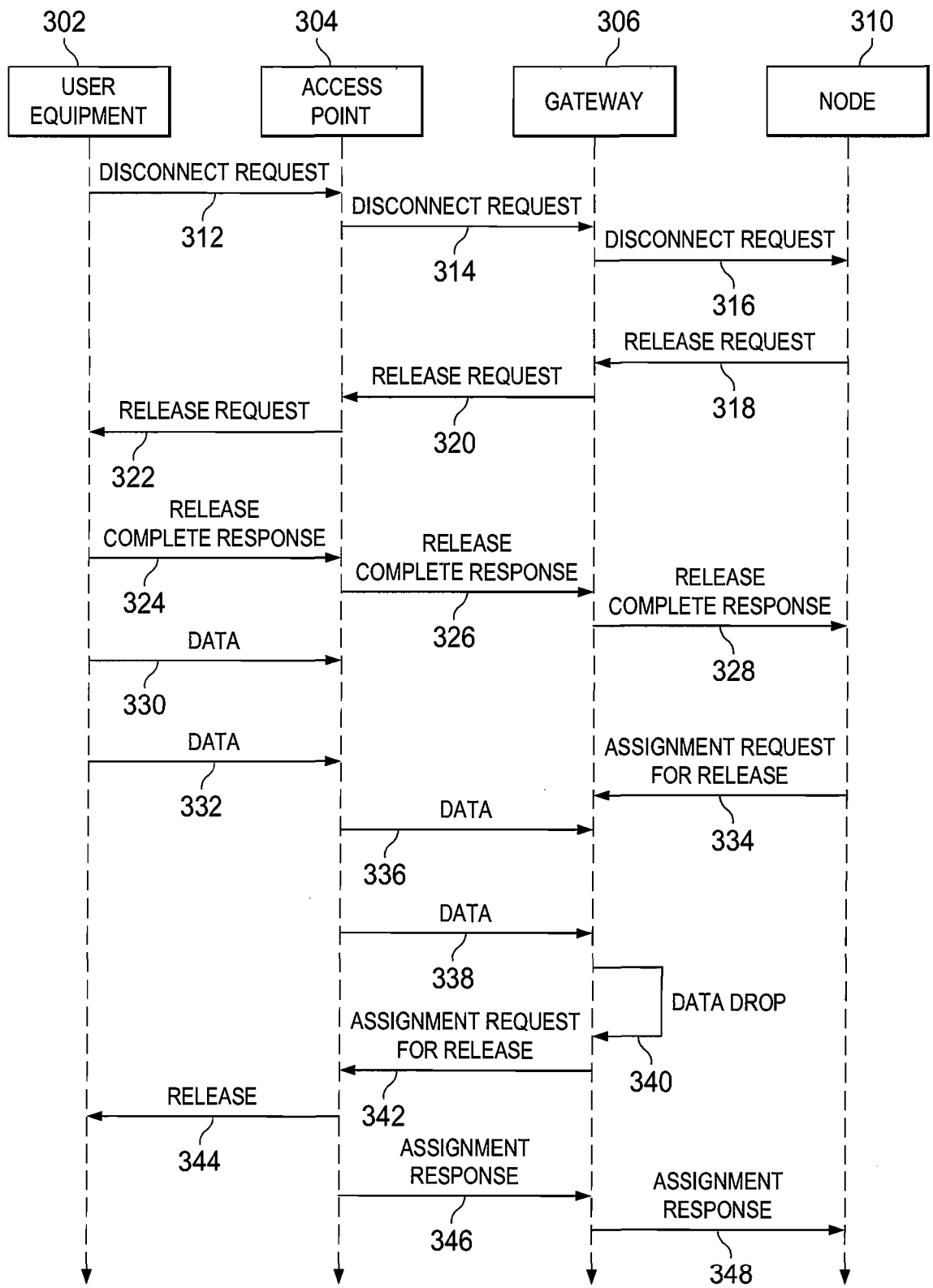
FIG. 3A-B are interaction diagrams showing use cases according to at least one example embodiment.
Figure 3B:
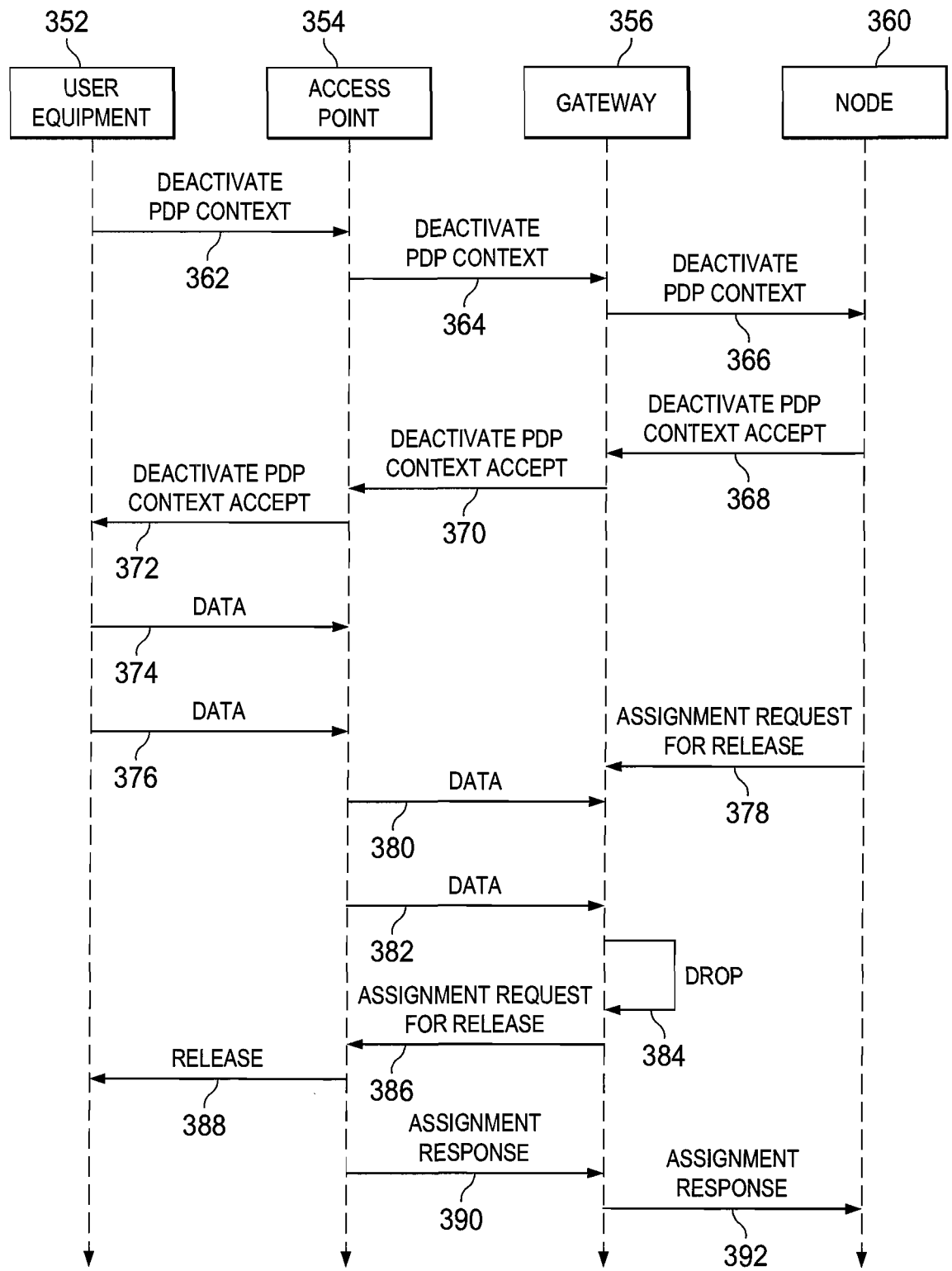

FIGS. 3A-3B are interaction diagrams showing use cases according to at least one example embodiment. In at least one example embodiment, there is a set of operations that corresponds with, at least some of, the activities of FIGS. 3A-3B. For example, there may be a set of operations associated with activities of one or more apparatuses of FIGS. 3A-3B. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIGS. 3A-3B.

In some circumstances, a broadband communication channel may be associated with a poor performance characteristic, such as high latency, low throughput, and/or the like. In such circumstances, the performance characteristic associated with backhaul quality may affect communication within the broadband communication channel. For example, latency within the broadband communication channel may result in a higher incidence of packet loss in a network. In certain circumstances, communication across a broadband communication channel relates to access point communication. In such circumstances, latency may lead to packet loss during a circuit switched call release case, a circuit switched call disconnect case, and/or the like. For example, when a user equipment releases a circuit switched call, a control message disconnect request is sent to a gateway. In such an example, after the disconnect request has been sent and before the call is disconnected, the user equipment may send additional data packets towards the gateway. If the broadband communication channel is experiencing high latency, the additional data packets may arrive at the gateway subsequent to completion of the disconnect request. Since the call has been disconnected by the time the additional data packets arrive at the gateway, the late arriving additional data packets may be dropped at the gateway. In such an example, the frequency of such packet drop cases may increase as latency associated with the broadband communication channel increases.

FIG. 3A is an interaction diagram showing a use case according to at least one example embodiment. At interaction 312, user equipment 302 sends a disconnect request to access point 304. At interaction 314, access point 304 sends a disconnect request to gateway 306. At interaction 316, gateway 306 sends a disconnect request to node 310. In the example of FIG. 3A, node 310 may relate to a serving general packet radio service support node, gateway general packet radio service support node, and/or the like. At interaction 318, node 310 sends a release request to gateway 306. At interaction 320, gateway 306 sends a release request to access point 304. At interaction 322, access point 304 sends a release request to user equipment 302. At interaction 324, user equipment 302 sends a release complete response to access point 304. At interaction 326, access point 304 sends a release complete response to gateway 306. At interaction 328, gateway 306 sends a release complete response to node 310. At interaction 330 and interaction 332, user equipment 302 sends data to access point 304. In the example of FIG. 3A, data may relate to call data, telephony data, data packets, and/or the like. At interaction 334, node 310 sends an assignment request for release to gateway 306. At interaction 336 and interaction 338, access point 304 sends data to gateway 306. At interaction 340, gateway 306 drops the data sent from user equipment 302 via access point 304 since gateway 306 previously received an assignment request for release from node 310. At interaction 342, gateway 306 sends an assignment request for release to access point 304. At interaction 344, access point 304 releases user equipment 302. At interaction 346, access point 304 sends an assignment response to gateway 306. At interaction 348, gateway 306 sends an assignment response to node 310.

In some circumstances, latency may lead to packet loss during a packet switched session release case, a packet switched session deactivation case, and/or the like. For example, when a user equipment releases a packet switched session, a control message deactivation request is sent to a gateway. In such an example, after the deactivation request has been sent and before the session is deactivated, the user equipment may send additional data packets towards the gateway. If the broadband communication channel is experiencing high latency, the additional data packets may arrive at the gateway subsequent to completion of the deactivation request. Since the session has been deactivated by the time the additional data packets arrive at the gateway, the late arriving additional data packets may be dropped at the gateway. In such an example, the frequency of such packet drop cases may increase as latency associated with the broadband communication channel increases.

FIG. 3B is an interaction diagram showing a use case according to at least one example embodiment. At interaction 362, user equipment 352 sends a deactivate packet data protocol context request to access point 354. In the example of FIG. 3B, a packet data protocol context relates to a connection between a user equipment and a network server that allows the user equipment and network server to communicate with each other for the duration of a specific connection. A deactivate packet data protocol context request relates to a request to deactivate a packet data protocol context connection. At interaction 364, access point 354 sends a deactivate packet data protocol context request to gateway 356. At interaction 366, gateway 356 sends a deactivate packet data protocol context request to node 360. In the example of FIG. 3B, node 360 may relate to a serving general packet radio service support node, gateway general packet radio service support node, and/or the like. At interaction 368, node 360 sends a deactivate packet data protocol acceptance to gateway 356. In the example of FIG. 3B, a deactivate packet data protocol acceptance relates to communication of an acceptance of a deactivate packet data protocol request. At interaction 370, gateway 356 sends a deactivate packet data protocol acceptance to access point 354. At interaction 372, access point 354 sends a deactivate packet data protocol acceptance to user equipment 352. At interaction 374 and interaction 376, user equipment 352 sends data to access point 354. In the example of FIG. 3A, data may relate to call data, telephony data, data packets, and/or the like. At interaction 378, node 360 sends an assignment request for release to gateway 356. At interaction 380 and interaction 382, access point 354 sends data to gateway 356. At interaction 384, gateway 356 drops the data sent from user equipment 352 via access point 354 since gateway 356 previously received an assignment request for release from node 360. At interaction 386, gateway 356 sends an assignment request for release to access point 354. At interaction 388, access point 354 releases user equipment 352. At interaction 390, access point 354 sends an assignment response to gateway 356. At interaction 392, gateway 356 sends an assignment response to node 360.

Figure 4:
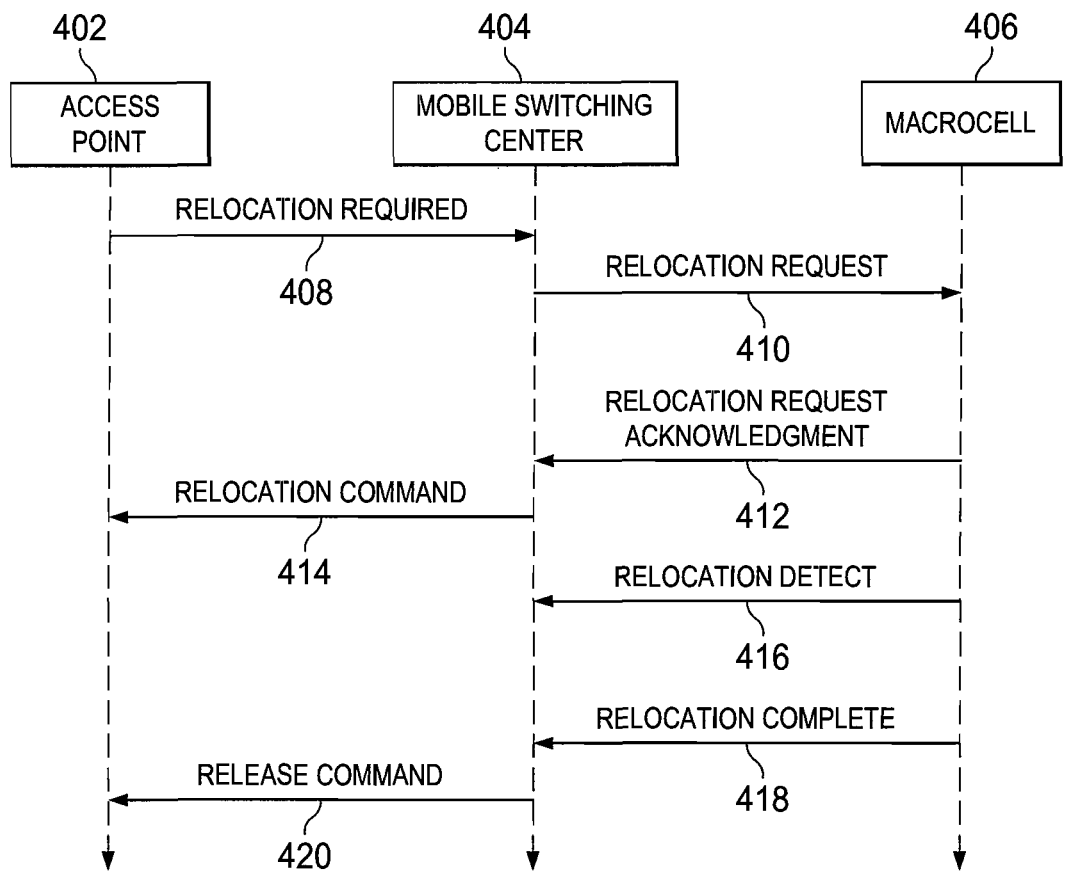
FIG. 4 is an interaction diagram showing handoff according to at least one example embodiment.

FIG. 4 is an interaction diagram showing handoff according to at least one example embodiment. In at least one example embodiment, there is a set of operations that corresponds with the activities of FIG. 4. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIG. 4.

In certain circumstances, it may be beneficial to migrate a call away from an access point. For example, a given location may be serviced by an access point and by a cellular network. In such an example, the cellular network may be provided by a macrocell. In such an example, as a connection associates with the access point degrades, it may be beneficial to migrate the connection to the cellular network associated with the macrocell. In at least one example embodiment, such a migration may relate to a handoff from a femtocell communication channel and to a macrocell communication channel. A macrocell communication channel may, for example, relate to a cellular network communication channel associated with a macrocell. In certain circumstances, a handoff between an access point and a cellular network may fail due to a broadband communication channel associated with a poor performance characteristic, such as high latency. For example, when a user equipment having an established, ongoing circuit switched call associated with an access point begins to move out of range of the access point, a handoff may be triggered between the access point and a macrocell. In such an example, various control messages may be exchanged between the access point and the macrocell. In one or more example embodiments, handoff is facilitated by a mobile switching server. A mobile switching center may, for example, relate to a core network element that controls network switching, cross connecting circuit switched calls using internet protocols, handoffs, and/or the like. In such an example, one such control message may relate to the setting of response timeout timers. A response timeout timer may, for example, set a timeout for receipt of a control message response. Failure to receive such a response within the response timeout period may, for example, result in a failed handoff between the access point and the macrocell. In such an example, since the user equipment is moving further away from the access point, a failed handoff to the macrocell may result in a dropped call. A dropped call may, for example, relate to an abnormal disconnection of an already established and ongoing call. If a broadband communication channel associated with the access point is experiencing high latency, the control message response may be delayed, causing late arrival of the control message response and a call drop. In such an example, the frequency of such call drop cases may increase as latency associated with the broadband communication channel increases.

At interaction 408, access point 402 sends data indicating that relocation is required to mobile switching center 404. In the example of FIG. 4, relocation may relate to a handoff from access point 402 to macrocell 406. At interaction 410, mobile switching center 404 sends a relocation request to macrocell 406. At interaction 412, macrocell 406 acknowledges the relocation request and sends a relocation request acknowledgement to mobile switching center 404. At interaction 414, in response to the relocation request acknowledgement, mobile switching center 404 sends a relocation command to access point 402. At interaction 416, macrocell 406 detects a relocation and sends a relocation detection acknowledgement to mobile switching center 404. At interaction 418, macrocell 406 sends a relocation complete acknowledgement to mobile switching center 404. At interaction 420, mobile switching center 404 sends a release command to access point 402.

Figure 5:
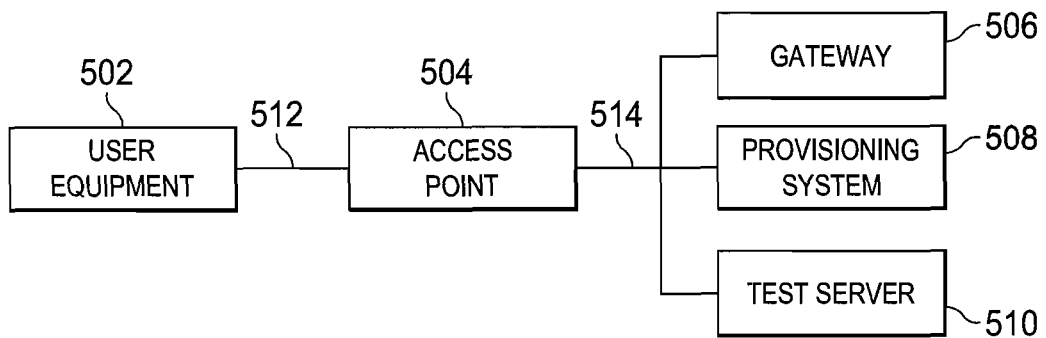
FIG. 5 is a simplified block diagram showing a system for managing access point communication utilization according to an example embodiment.

FIG. 5 is a simplified block diagram showing a system for managing access point communication utilization according to an example embodiment. The example of FIG. 5 is merely an example and does not limit the scope of the claims. For example, user equipment count may vary, access point count may vary, gateway count may vary, communication path may vary, intermediary placement, arrangement, and/or communication channels may vary, and/or the like.

In certain circumstances, a user may desire to determine a performance characteristic associated with a broadband communication channel, the broadband communication channel being associated with an access point. For example, in order to better understand bandwidth and/or capacity of the broadband communication channel, the user may desire to quantify some performance characteristic associated with the broadband communication channel. Determination of the performance characteristic may, for example, be based, at least in part, on test communications with a test server. In at least one example embodiment, the test communications may relate to the sending and/or receiving of test packets to and/or from a test server. In at least one example embodiment, a determination of a performance characteristic associated with a broadband communication channel includes communicating with a test server and measuring at least one test communication characteristic. In one or more example embodiments, a test server relates to a network node equipped for determining a performance characteristic associated with a broadband communication channel, a third party performance characteristic measuring server, and/or the like. The performance characteristic may, for example, be based, at least in part, on the test communication characteristic. It may be desirable for a test server to be located proximate to a gateway such that a test server communication and test communication characteristic of a broadband communication channel between an access point and the test server accurately approximates a communication characteristic and/or a performance characteristic of a broadband communication channel between the access point and the gateway.

In at least one example embodiment, the apparatus may determine a performance classification that is indicative of a range of performance characteristics of the broadband communication channel. For example, there may be an enumerated set of performance classifications that are associated with various ranges of performance characteristics. For example, there may be a performance classification that identifies a set of broadband communication performance characteristics, and a different performance classification that identifies a different set of broadband characteristics. In such an example, there may be a performance classification 1, a performance classification 2, a performance classification 3, a performance classification 4, etc. which are each associated with a different range of performance characteristics of a broadband communication channel. In this manner, that apparatus may identify a performance classification of the broadband communication channel, and manage communication channels based on the performance classification. In this manner, the complexity associated with management of a communication channel based, at least in part, on a performance classification may less than complexity associated with management of a communication channel based directly upon specific values of performance characteristics of the broadband communication channel.

In certain circumstances, it may be desirable to manage access point communication channel utilization based, at least in part, on a performance characteristic associated with a broadband communication channel. For example, if the broadband communication channel is associated with poor performance characteristics, it may be desirable to modify access point communication channel utilization based, at least in part, on the poor performance characteristics. In such an example, the broadband communication channel may have the bandwidth to support one high fidelity call or two low fidelity calls. A low fidelity call may, for example, relate to a call having a low bitrate, a low quality, a small bandwidth allocation, and/or the like. A high fidelity call may, for example, relate to a call having a high bitrate, a high quality, a high bandwidth allocation, and/or the like. If there is only one call present, the user may prefer the call to utilize the full bandwidth of the broadband communication channel. If a second call is created, the user may desire for both calls to transition to a low fidelity mode such that the broadband communication channel may provide sufficient bandwidth for both low fidelity calls. In such an example, since performance characteristics associated with the broadband communication channel may fluctuate over time and/or instance, the user may desire for such performance characteristic to be determined on a continual and/or ongoing basis such that access point communication channel utilization may be continually modified based, at least in part, on the performance characteristic.

In at least one example embodiment, managing access point communication channel utilization relates to controlling the manner in which an access point utilizes a user equipment communication channel, a broadband communication channel, and/or the like. Managing access point communication channel utilization of the broadband communication channel may, for example, relate to controlling at least one parameter associated with the broadband communication channel. In one or more example embodiments, the parameters associated with the broadband communication channel relate to a gateway communication parameter, a transmission parameter, and/or the like. For example, based, at least in part, on periodic evaluation and/or categorization of at least one performance characteristic associated with the broadband communication channel, an access point and/or a core node, such as a gateway, a provisioning system, and/or the like, may control, set, tune, and/or modify configuration parameters based, at least in part, on at least one performance characteristic, such as broadband communication channel capacity and/or quality. In at least one example embodiment, a gateway communication parameter may relate to a home node b registration timer parameter, a radio access bearer establishment timer parameter, a handoff timer parameter, and/or the like. In one or more example embodiments, a transmission parameter may relate to a stream control transmission protocol packet retransmission limit parameter, a stream control transmission protocol acknowledgement timeout parameter, a stream control transmission protocol heartbeat timeout parameter, a stream control transmission protocol packet queue size parameter, a traffic priority differentiated services code point configuration parameter, and/or the like. In at least one example embodiment, managing access point communication channel utilization of the broadband communication channel relates to causation of communication of at least one setting indicating a value of at least one parameter associated with the broadband communication channel. For example, the causation of communication of the setting may relate to sending the setting to at least one of the gateway or a provisioning system.

In certain circumstances, it may be desirable to manage a user equipment communication channel. For instance, it may be desirable to manage a user equipment communication channel based on at least one performance characteristic associated with a broadband communication channel. Additionally, for example, it may be desirable to manage a user equipment communication channel in addition to managing a broadband communication channel, instead of the broadband communication channel, and/or the like. In at least one example embodiment, managing access point communication channel utilization of the user equipment communication channel relates to controlling at least one parameter associated with the user equipment communication channel. For example, the parameters associated with the user equipment communication channel may relate a bearer communication parameter, a transmission parameter, and/or the like. In one or more example embodiments, a bearer communication parameter may relate to a quality of service parameter, a traffic class parameter, a maximum bit rate parameter, a guaranteed bit rate parameter, a delivery order parameter, a maximum session data unit size parameter, a session data unit error ratio parameter, a transfer delay parameter, a traffic handling priority parameter, and/or the like. In one or more example embodiments, a transmission parameter may relate to a home node b registration timer, a radio access bearer establishment timer, a stream control transmission protocol packet retransmission limit parameter, a stream control transmission protocol acknowledgement timeout parameter, a stream control transmission protocol heartbeat timeout parameter, a stream control transmission protocol packet queue size parameter, a traffic priority differentiated services code point configuration parameter, and/or the like.

For example, it may be desirable to establish and/or modify parameters of a bearer channel that align with the performance characteristics of the broadband channel. For example, the bearer channel may be established and/or modified with parameters that govern communication on the bearer channel, such as a stream control transmission protocol packet retransmission limit parameter, a stream control transmission protocol acknowledgement timeout parameter, a stream control transmission protocol heartbeat timeout parameter, a stream control transmission protocol packet queue size parameter, a traffic priority differentiated services code point configuration parameter, and/or the like. In such an example, if the performance characteristics of the broadband channels indicate poor performance, it may be desirable to set the radio access bearer establishment timer to a higher value than if the performance characteristic of the broadband channel were better. For example, if the performance characteristics of the broadband channels indicate poor performance, it may be desirable to set the radio access bearer establishment timer to 10 seconds instead of 8 seconds. In another example, it may be desirable to establish and/or modify a bearer channel with quality of service settings that align with the performance characteristics of the broadband channel. For example, the bearer channel may be established and/or modified with parameters such as traffic class, maximum bit rate, guaranteed bit rate, delivery order, maximum session data unit size, session data unit error ration, transfer delay, traffic handling priority, and/or the like. For example, if the performance characteristics of the broadband channel indicate that the bit rate fluctuates above a particular bitrate threshold, it may be desirable to establish the bearer.

In at least one example embodiment, the parameters may be set based, at least in part, on a performance characterization of the broadband communication channel. For example, there may be a data structure, such as a table, that provides a set of setting values to be utilized when a particular performance classification of a broadband communication channel is identified. In this manner, the apparatus may determine values to apply to various settings by way of identifying the performance classification of the broadband communication channel, and applying the setting values that are associated with the identified performance classification. In this manner, the complexity associated with setting parameters of a communication channel based, at least in part, on a performance classification may less than complexity associated with setting parameters of a communication channel based, at least in part, on a performance classification may less based directly upon specific values of performance characteristics of the broadband communication channel.

In certain circumstances, it may be desirable to allocate and/or manage access point resources and, in turn, broadband communication channel utilization based, at least in part, on at least one performance characteristic associated with the broadband communication channel. For example, an access point may receive a request to allocate access point resources to a bearer channel associated with a user equipment. In at least one example embodiment, an access point receives an allocation request for allocation of at least one access point resource. For example, the access point may receive the allocation request from an associated user equipment phone for establishment of a call. In at least one example embodiment, managing access point communication channel utilization of a user equipment communication channel relates to controlling allocation of at least one access point resource with respect to user equipment associated with the user equipment communication channel. Controlling allocation of an access point resource may, for example, relate to an allocation determination regarding a bearer channel between a user equipment and the access point. In such an example, the allocation determination may relate to a determination to allocate, a determination to preclude allocation, and/or the like. In at least one example embodiment, an allocation determination may be based, at least in part, on a performance characteristic associated with a broadband communication channel, a user equipment communication channel, and/or the like.

In some circumstances, it may be desirable to base an allocation determination on the existence of an ongoing call associated with an access point. For example, in a case similar to that previously described, a call established via an access point associated with a currently ongoing call may be associated with low quality of service parameters and/or cause the ongoing call to be modified such that the broadband communication channel has bandwidth capacity for both calls to exist simultaneously. As such, in at least one example embodiment, an allocation determination may be based, at least in part, on an allocation of a different bearer channel to a different user equipment. The different user equipment may, for example, relate to a phone, a tablet, a laptop, and/or the like. The different bearer channel may, for example, relate to a different cellular communication channel, a different wireless communication channel, and/or the like. In one or more example embodiments, a communication characteristic associated with a different bearer channel may exceed a communication characteristic associated with the bearer channel. In such an example embodiment, the different bearer channel may be modified based, at least in part, on the communication characteristic, a performance characteristic associated with a broadband communication channel, and/or the like. In at least one example embodiment, a communication characteristic relates to a quality of service characteristic, a transmission characteristic, a performance characteristic, a bandwidth characteristic, a resource utilization characteristic, a bit rate characteristic, and/or the like. In one or more example embodiments, modification of a different bearer channel may relate to initiation of a handoff associated with the different bearer channel from an access point and to a different access point. For example, if the access point associated with the different bearer channel has insufficient access point resources, the access point may cause initiation of the handoff of the different bearer channel to the different access point. In such an example, the different access point may have access point resources sufficient to accept the handoff of the different bearer channel. In at least one example embodiment, an allocation determination relates to a determination to allocate and an access point causes allocation of a bearer channel. For example, if the access point has sufficient resources to accept an allocation request based, at least in part, on available access point resources, modification of a different bearer channel communication characteristic, and/or the like, the access point may determine to allocate the requested access point resource and cause said allocation.

In certain circumstances, a user may desire for access point resource allocation to be based, at least in part, on additional characteristics, call metadata, and/or the like. In at least one example embodiment, allocation of a bearer channel relates to a determination of a bearer type based, at least in part, on the performance characteristic. For example, the bearer type may be based, at least in part, on an allocation of a different bearer channel to a different user equipment. The bearer type may relate to circuit switched session, a packet switched session, and/or the like. In such an example, the access point may be more likely to cause initiation of a handoff of the circuit switched session and/or less likely to cause initiation of a handoff of the packet switched session based, at least in part, on communication characteristics associated with each bearer type. In at least one example embodiment, a bearer channel relates to an emergency call. In such an embodiment, a determination to allocate access point resources to the bearer channel may be based, at least in part, on the emergency call. For example, a certain bearer channel and/or a certain bearer type may have access point resource allocation priority over a different bearer channel and/or a different bearer channel type.

In at least one example embodiment, an allocation determination may relate to a determination to preclude allocation. The determination to preclude allocation may, for example, be based, at least in part, on a performance characteristic associated with a broadband communication channel. For example, the performance characteristic may indicate that the broadband communication channel may be unable to support the allocation of the bearer channel due to bandwidth constraints, simultaneous data traffic associated with the broadband communication channel, simultaneous user equipment communication channel traffic associated with an access point, and/or the like. In such an example, based, at least in part, on the determination to preclude allocation, the access point may cause initiation of a handoff with a different access point. The handoff may, for example, relate to allocation of a bearer channel by the different access point. In at least one example embodiment, modification of a different bearer channel may relate to causation of a downgrade of the different bearer channel. Downgrade of the different bearer channel may, for example, relate to changing a bearer type of the different bearer channel such that a communication characteristic associated with the different bearer channel is reduced. For example, if access point resources associated with an access point are approaching full utilization, a communication characteristic associated with the different bearer channel may be downgraded such that access point resource utilization is reduced. In such an example, access point resource utilization may be reduced by reducing a bit rate of a bearer communication channel, a different bearer communication channel, and/or the like. In some circumstances, a downgrade modification of a bearer channel and/or a different bearer channel may not sufficiently reduce access point resource utilization. In at least one example embodiment, modification of a different bearer channel may relate to causation of termination of the different bearer channel. In at least one example embodiment, based, at least in part, on a determination to preclude allocation, an access point may cause communication of a rejection of allocation of a bearer channel to a user equipment, a gateway, and/or the like.

FIG. 5 is a simplified block diagram showing a system for managing access point communication utilization according to an example embodiment. In the example of FIG. 5, user equipment 502 is connected to access point 504 via communication channel 512. User equipment 502 relates to a phone, a tablet, a laptop, and/or the like. In the example of FIG. 5, more than one user equipment may be connected to access point 504 via communication channel 512 and/or other communication channels. Access point 504 relates to a femtocell access point, home node b access point, and/or the like. Communication channel 512 relates to a cellular communication channel, a wireless local area network communication channel, a Bluetooth communication channel, and/or the like. In the example of FIG. 5, access point 504 is connected to gateway 506, provisioning system 508, and test server 510 via communication channel 514. Gateway 506 may relate to a home node b gateway, home evolved node b gateway, and/or the like. Provisioning system 508 relates to a femtocell provisioning system, a femtocell provisioning gateway, a home node b management system, a home evolved node b management system, and/or the like. Test server 510 relates to a third party test server, a network node equipped for determining a performance characteristic, and/or the like. Communication channel 514 relates to a broadband communication channel, a local area network communication channel, a wide area network communication channel, a wireless local area network communication channel, a cellular communication channel, and/or the like.

Figure 6:
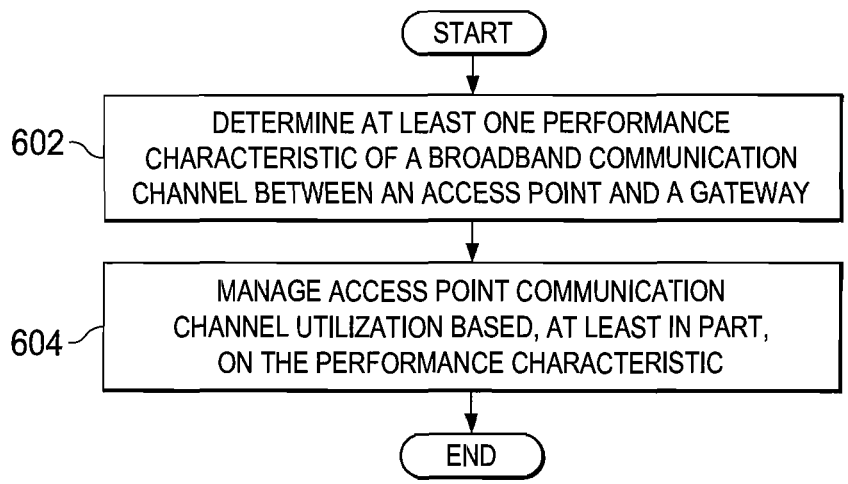
FIG. 6 is a simplified flowchart illustrating activities associated with managing access point communication utilization according to at least one example embodiment.

FIG. 6 is a simplified flowchart illustrating activities associated with managing access point communication utilization according to at least one example embodiment. In at least one example embodiment, there is a set of operations that corresponds with the activities of FIG. 6. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIG. 6.

At block 602, the apparatus determines at least one performance characteristic of a broadband communication channel between an access point and a gateway, similar as described regarding FIG. 5.

At block 604, the apparatus manages access point communication channel utilization based, at least in part, on the performance characteristic, similar as described regarding FIG. 5.

Figure 7:
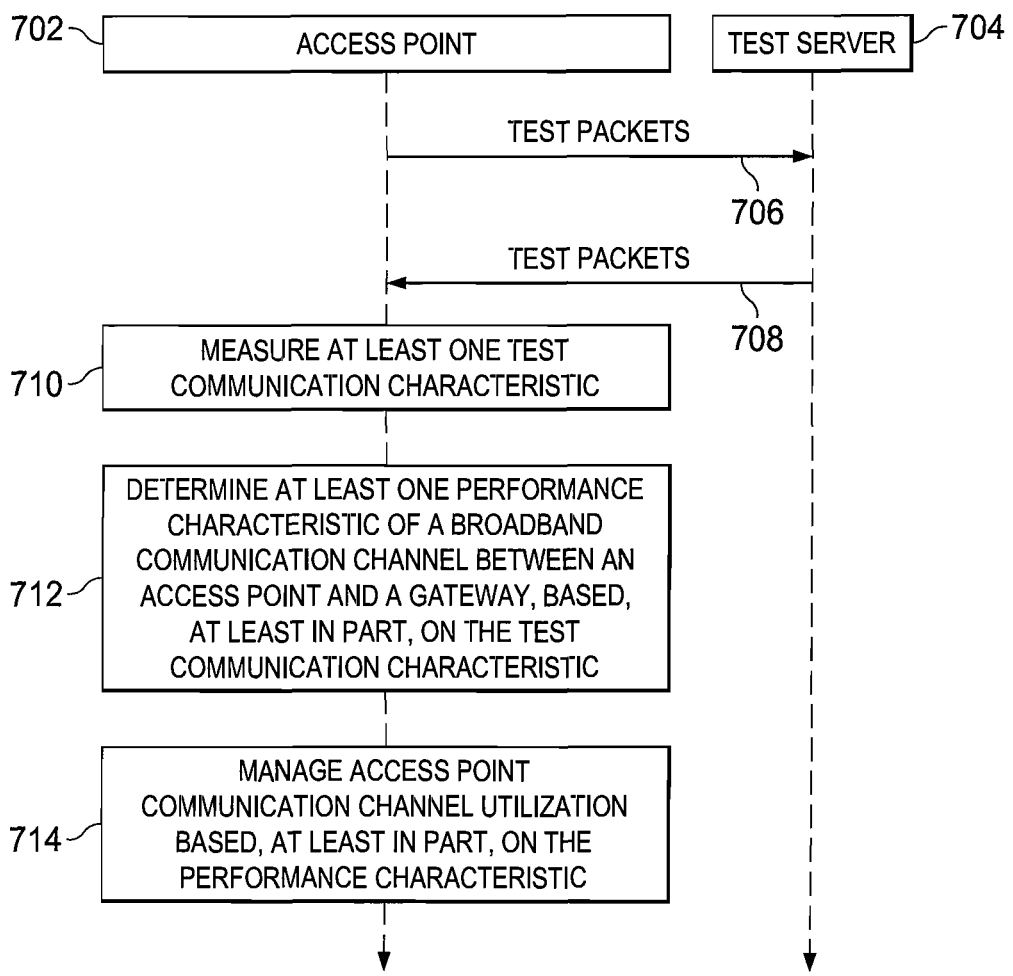
FIG. 7 is an interaction diagram showing managing access point communication utilization according to at least one example embodiment.

FIG. 7 is an interaction diagram showing managing access point communication utilization according to at least one example embodiment. In at least one example embodiment, there is a set of operations that corresponds with, at least some of, the activities of FIG. 7. For example, there may be a set of operations associated with activities of one or more apparatuses of FIG. 7. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIG. 7.

At interaction 706, access point 702 sends test packets to test server 704, similar as described regarding FIG. 5.

At interaction 708, test server 704 sends test packets to access point 702, similar as described regarding FIG. 5.

At block 710, access point 702 measures at least one test communication characteristic, similar as described regarding FIG. 5.

At block 712, access point 702 determines at least one performance characteristic of a broadband communication channel between an access point and a gateway, based, at least in part, on the test communication characteristic, similar as described regarding FIG. 5.

At block 714, access point 702 manages access point communication channel utilization based, at least in part, on the performance characteristic, similar as described regarding block 604 of FIG. 6.

Figure 8:
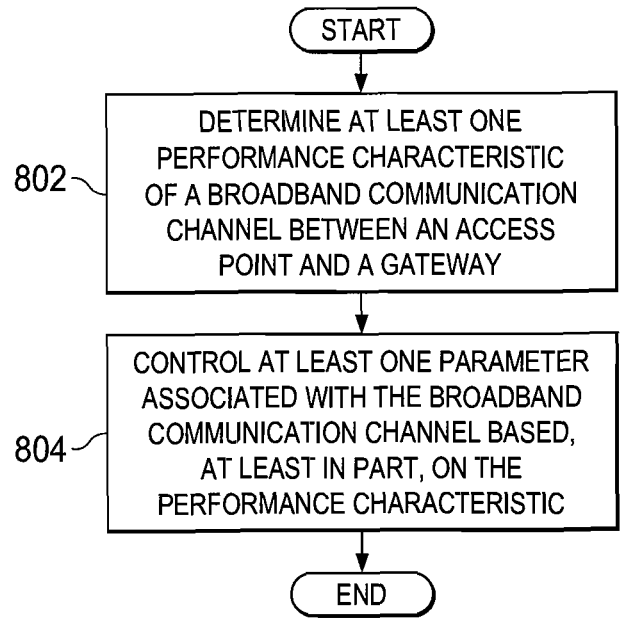
FIG. 8 is a simplified flowchart illustrating activities associated with managing access point communication utilization according to at least one example embodiment.

FIG. 8 is a simplified flowchart illustrating activities associated with managing access point communication utilization according to at least one example embodiment. In at least one example embodiment, there is a set of operations that corresponds with the activities of FIG. 8. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIG. 8.

At block 802, the apparatus determines at least one performance characteristic of a broadband communication channel between an access point and a gateway, similar as described regarding block 602 of FIG. 6.

At block 804, the apparatus controls at least one parameter associated with the broadband communication channel based, at least in part, on the performance characteristic, similar as described regarding FIG. 5.

Figure 9:
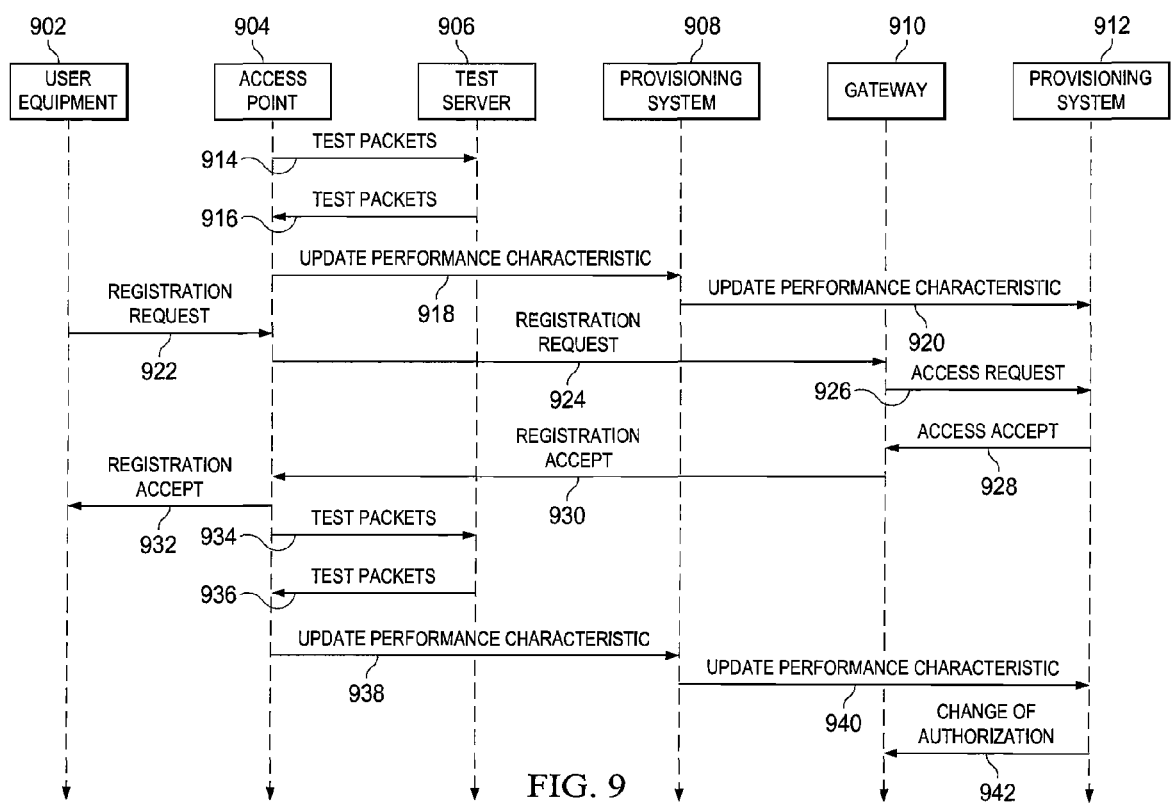
FIG. 9 is an interaction diagram showing managing access point communication utilization according to at least one example embodiment.

FIG. 9 is an interaction diagram showing managing access point communication utilization according to at least one example embodiment. In at least one example embodiment, there is a set of operations that corresponds with, at least some of, the activities of FIG. 9. For example, there may be a set of operations associated with activities of one or more apparatuses of FIG. 9. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIG. 9.

At interaction 914, access point 904 sends test packets to test server 906, similar as described regarding interaction 706 of FIG. 7. At interaction 916, test server 906 sends test packets to access point 904, similar as described regarding interaction 708 of FIG. 7. At interaction 918, access point 904 sends at least one performance characteristic update to provisioning system 908, similar as described regarding FIG. 5. At interaction 920, provisioning system 908 sends at least one performance character update to provisioning system 912. In the example of FIG. 9, provisioning system 912 may be associated with provisioning system 908, may relate to an authentication, authorization and accounting system, and/or the like. At interaction 922, user equipment 902 sends a registration request to access point 904. At interaction 924, access point 904 sends a registration request to gateway 910. At interaction 926, gateway 910 sends an access request to provisioning system 912. At interaction 928, provisioning system 912 sends an access acceptance in response to the access request of interaction 926 to gateway 910. At interaction 930, gateway 910 sends a registration acceptance to access point 904. At interaction 932, access point 904 sends a registration acceptance to user equipment 902. At interaction 934, access point 904 sends test packets to test server 906, similar as described regarding interaction 706 of FIG. 7. At interaction 936, test server 906 sends test packets to access point 904, similar as described regarding interaction 708 of FIG. 7. At interaction 938, access point 904 sends at least one performance characteristic update to provisioning system 908, similar as described regarding interaction 918 of FIG. 9. At interaction 940, provisioning system 908 sends at least one performance character update to provisioning system 912, similar as described regarding interaction 920 of FIG. 9. At interaction 942, provisioning system 912 sends a change of authorization based, at least in part, on the updated performance characteristic. In the example of FIG. 9, interaction 934, interaction 936, interaction 938, interaction 940, and interaction 942 may continually repeat such that the performance characteristic is continually updated and authorization is continually changed based, at least in part, on the continually updated performance characteristic.

Figure 10:
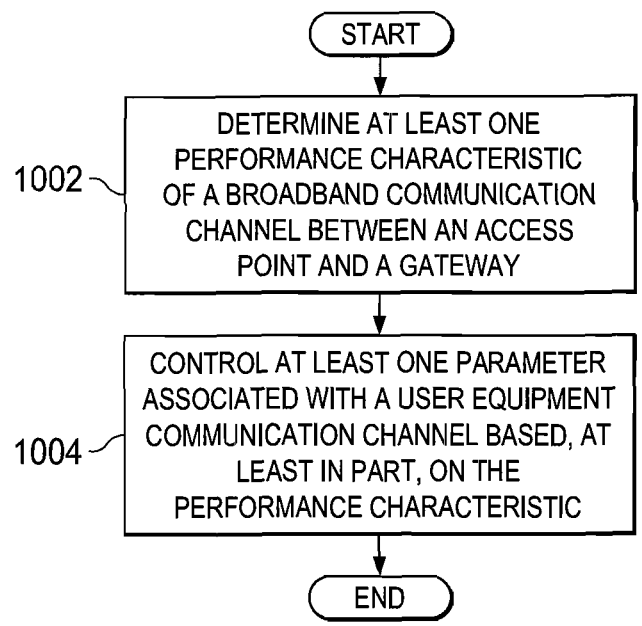
FIG. 10 is a simplified flowchart illustrating activities associated with managing access point communication utilization according to at least one example embodiment.

FIG. 10 is a simplified flowchart illustrating activities associated with managing access point communication utilization according to at least one example embodiment. In at least one example embodiment, there is a set of operations that corresponds with the activities of FIG. 10. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIG. 10.

At block 1002, the apparatus determines at least one performance characteristic of a broadband communication channel between an access point and a gateway, similar as described regarding block 602 of FIG. 6.

At block 1004, the apparatus controls at least one parameter associated with a user equipment communication channel based, at least in part, on the performance characteristic, similar as described regarding FIG. 5.

Figure 11:
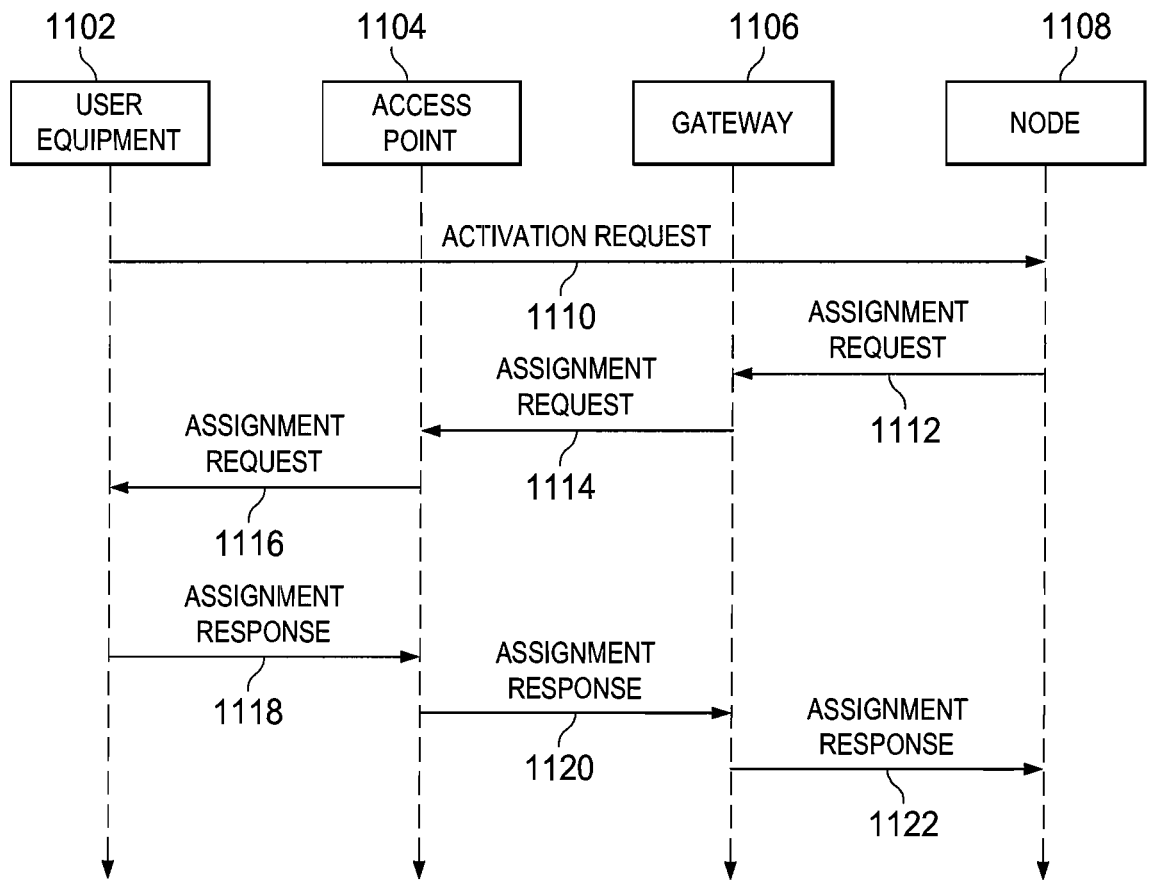
FIG. 11 is an interaction diagram showing managing access point communication utilization according to at least one example embodiment.

FIG. 11 is an interaction diagram showing managing access point communication utilization according to at least one example embodiment. In at least one example embodiment, there is a set of operations that corresponds with, at least some of, the activities of FIG. 11. For example, there may be a set of operations associated with activities of one or more apparatuses of FIG. 11. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIG. 11.

At interaction 1110, user equipment 1102 sends an activation request to node 1108 via access point 1104, gateway 1006, and/or the like, similar as described regarding FIG. 5. In the example of FIG. 11, activation request 1110 relates to a circuit switched call initiation request, a packet switched session initiation request, and/or the like. Node 1108 may, for example, relate to a mobile switching center, a serving general packet radio service support node, and/or the like. At interaction 1112, node 1108 sends an assignment request to gateway 1106, similar as described regarding FIG. 5. In the example of FIG. 11, gateway 1106 relates to a home node b gateway, a home evolved node b gateway, and/or the like. Assignment request 1112 may, for example, include at least one quality of service value based, at least in part, on a performance characteristic associated with a broadband communication channel associated with access point 1104, similar as described regarding FIG. 5. In the example of FIG. 11, access point 1104 relates to a femtocell access point, a home node b access point, and/or the like. At interaction 1114, gateway 1106 sends an assignment request to access point 1104, similar as described regarding FIG. 5. Assignment request 1114 may, for example, include at least one quality of service value, similar as described regarding interaction 1112 of FIG. 11. At interaction 1116, access point 1104 sends an assignment request to user equipment 1102, similar as described regarding FIG. 5. Assignment request 1116 may be associated with at least one quality of service value, similar as described regarding interaction 1112 and/or at least one predetermined quality of service value based, at least in part, on the quality of service value received from gateway 1106 and/or at least one performance characteristic associated with a broadband communication channel associated with access point 1104. At interaction 1118, user equipment 1102 sends an assignment response to access point 1104, the assignment response associated with at least one local quality of service value, similar as described regarding FIG. 5. At interaction 1120, access point 1104 sends an assignment response to gateway 1120, the assignment response associated with at least one location quality of service value, similar as described regarding FIG. 5. At interaction 1122, gateway 1106 sends an assignment response to node 1108, the assignment response associated with at least one location quality of service value, similar as described regarding FIG. 5. In the example of FIG. 11, in response to receiving assignment response 1120 associated with at least one local quality of service value, node 1108 can accept the at least one quality of service value, can send a modified quality of service value back towards gateway 1106 as part of a quality of service modification procedure, and/or the like.

Figure 12:
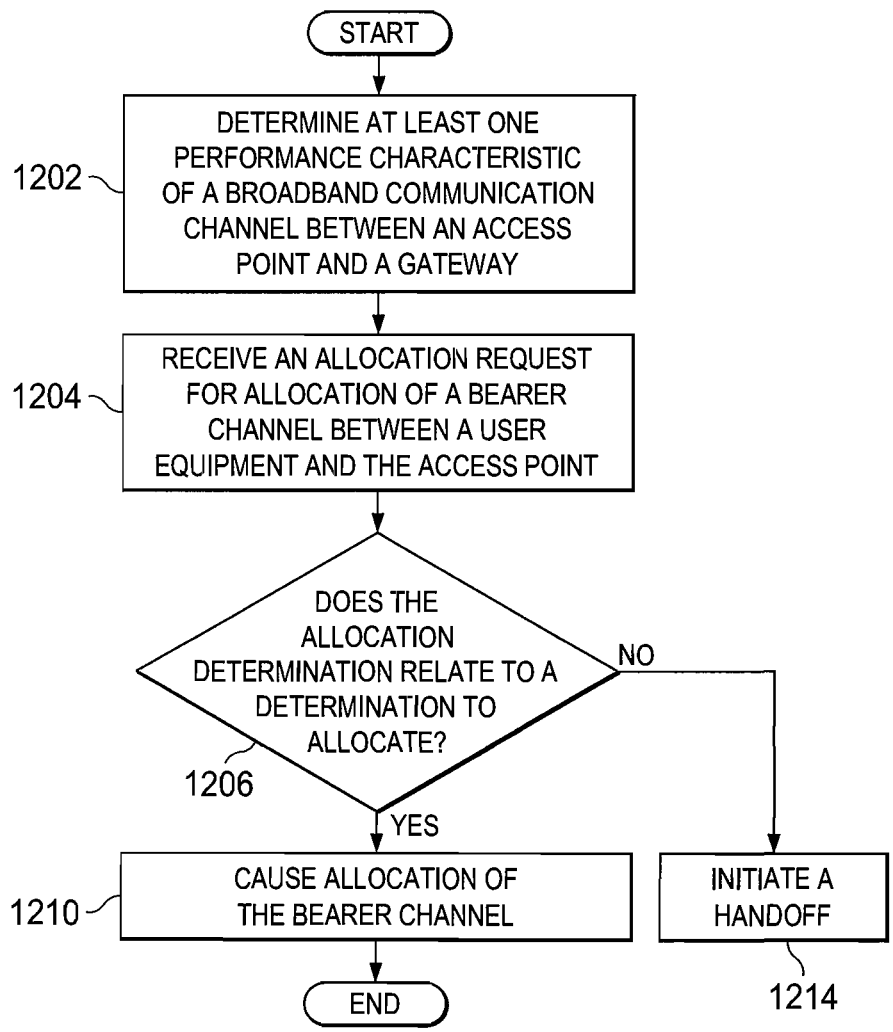
FIG. 12 is a simplified flowchart illustrating activities associated with managing access point communication utilization according to at least one example embodiment.

FIG. 12 is a simplified flowchart illustrating activities associated with managing access point communication utilization according to at least one example embodiment. In at least one example embodiment, there is a set of operations that corresponds with the activities of FIG. 12. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIG. 12.

At block 1202, the apparatus determines at least one performance characteristic of a broadband communication channel between an access point and a gateway, similar as described regarding block 602 of FIG. 6.

At block 1204, the apparatus receives an allocation request for allocation of a bearer channel between a user equipment and the access point, similar as described regarding FIG. 5.

At block 1206, the apparatus determines whether the allocation determination relates to a determination to allocate, similar as described regarding FIG. 5. If the allocation determination relates to a determination to allocate, flow proceeds to block 1210. If the allocation determination relates to a determination to preclude allocation, flow proceeds to block 1214.

At block 1210, the apparatus causes allocation of the bearer channel, similar as described regarding FIG. 5. In this manner, causation of allocation of the bearer channel may be based, at least in part, on a determination to allocate.

At block 1214, the apparatus initiates a handoff, similar as described regarding FIG. 4 and FIG. 5. In this manner, initiation of the handoff may be based, at least in part, on a determination to preclude allocation.

Figure 13:
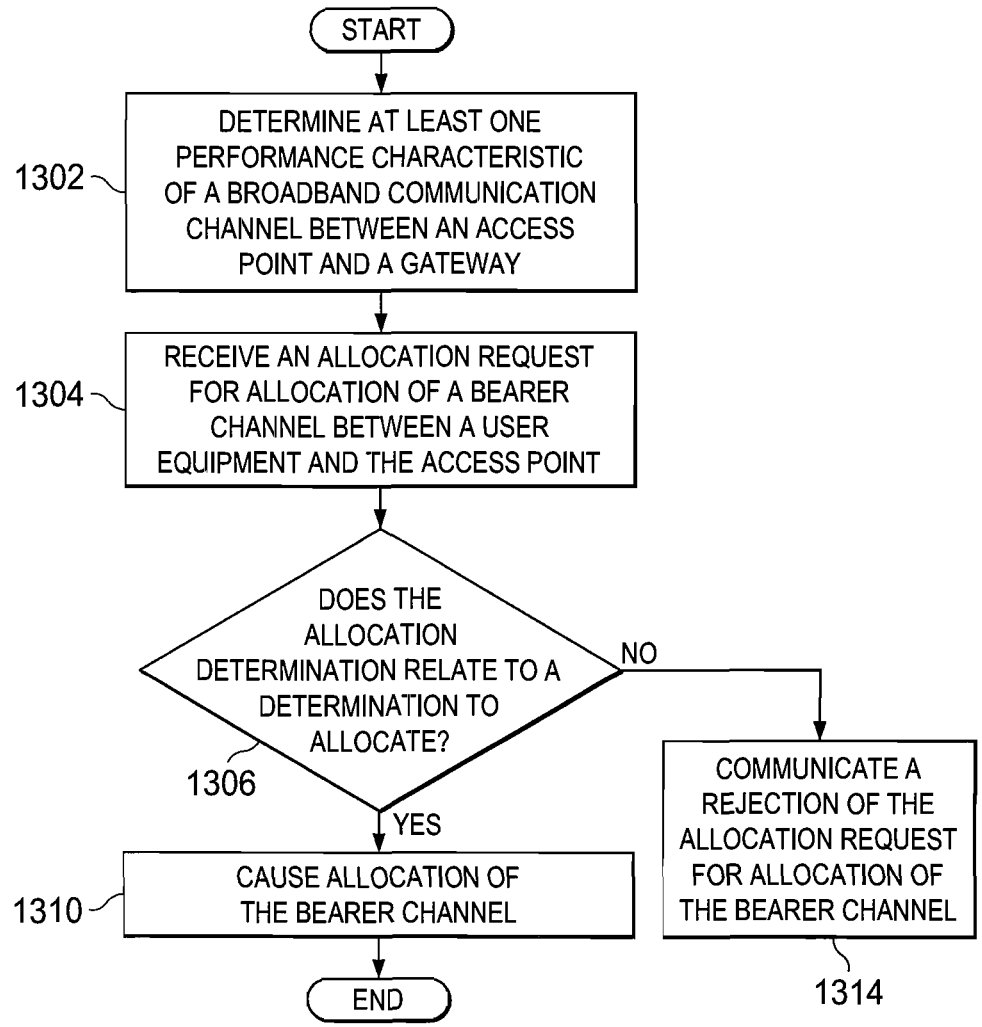
FIG. 13 is a simplified flowchart illustrating activities associated with managing access point communication utilization according to at least one example embodiment.

FIG. 13 is a simplified flowchart illustrating activities associated with managing access point communication utilization according to at least one example embodiment. In at least one example embodiment, there is a set of operations that corresponds with the activities of FIG. 13. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIG. 13.

At block 1302, the apparatus the apparatus determines at least one performance characteristic of a broadband communication channel between an access point and a gateway, similar as described regarding block 602 of FIG. 6.

At block 1304, the apparatus receives an allocation request for allocation of a bearer channel between a user equipment and the access point, similar as described regarding block 1204 of FIG. 12.

At block 1306, the apparatus determines whether the allocation determination relates to a determination to allocate, similar as described regarding block 1206 of FIG. 12. If the allocation determination relates to a determination to allocate, flow proceeds to block 1310. If the allocation determination relates to a determination to preclude allocation, flow proceeds to block 1314.

At block 1310, the apparatus causes allocation of the bearer channel, similar as described regarding block 1210 of FIG. 12. In this manner, causation of allocation of the bearer channel may be based, at least in part, on a determination to allocate.

At block 1314, the apparatus communicates a rejection of the allocation request for allocation of the bearer channel, similar as described regarding FIG. 5. In this manner, initiation of the handoff may be based, at least in part, on a determination to preclude allocation.

Figure 14:
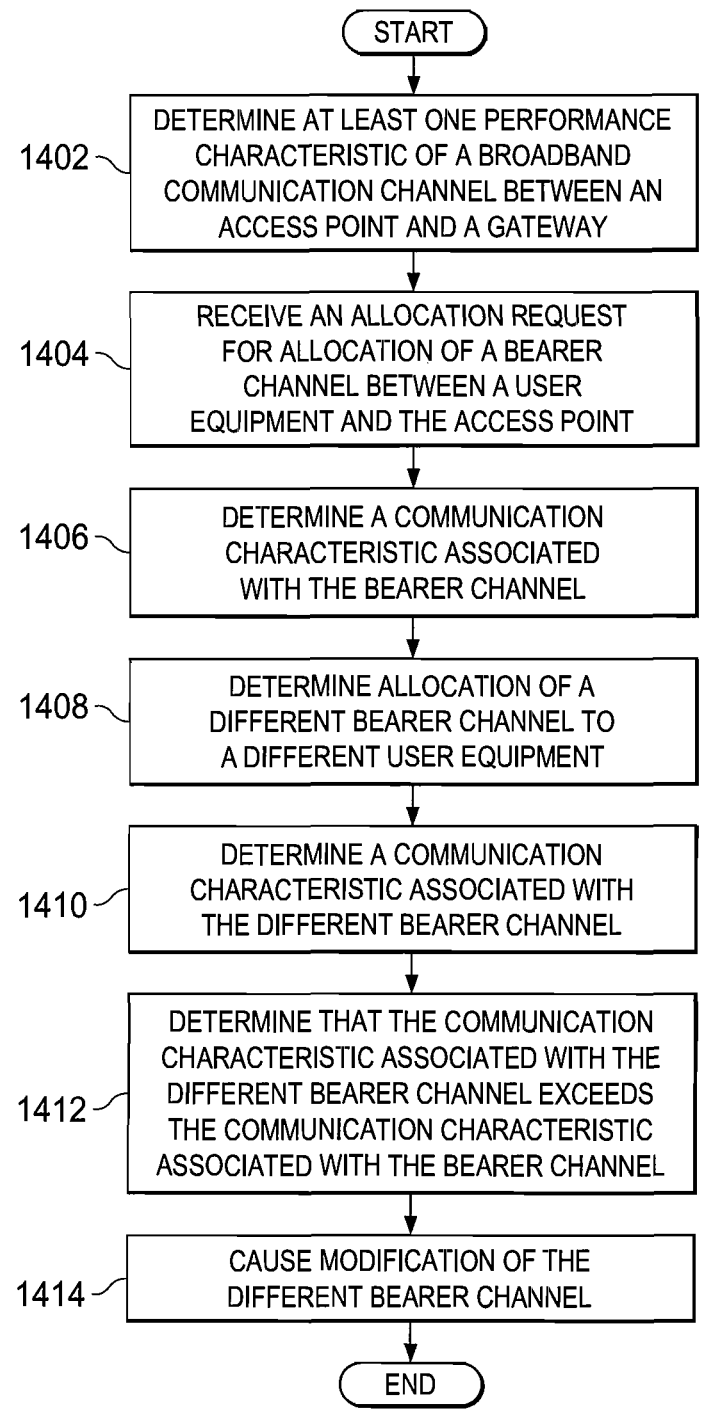
FIG. 14 is a simplified flowchart illustrating activities associated with managing access point communication utilization according to at least one example embodiment.

FIG. 14 is a simplified flowchart illustrating activities associated with managing access point communication utilization according to at least one example embodiment. In at least one example embodiment, there is a set of operations that corresponds with the activities of FIG. 14. An apparatus, for example access point 200 of FIG. 2, or a portion thereof, may utilize the set of operations. The access point may comprise means, including, for example processor(s) 202 of FIG. 2, for performance of such operations. In an example embodiment, an apparatus, for example access point 200 of FIG. 2, is transformed by having memory, for example memory element 204 of FIG. 2, comprising computer code configured to, working with a processor, for example processor(s) 202 of FIG. 2, cause the apparatus to perform set of operations of FIG. 14.

At block 1402, the apparatus determines at least one performance characteristic of a broadband communication channel between an access point and a gateway, similar as described regarding block 602 of FIG. 6.

At block 1404, the apparatus receives an allocation request for allocation of a bearer channel between a user equipment and the access point, similar as described regarding block 1204 of FIG. 12.

At block 1406, the apparatus determines a communication characteristic associated with the bearer channel, similar as described regarding FIG. 5.

At block 1408, the apparatus determines allocation of a different bearer channel to a different user equipment, similar as described regarding FIG. 5.

At block 1410, the apparatus determines a communication characteristic associated with the different bearer channel, similar as described regarding FIG. 5.

At block 1412, the apparatus determines that the communication characteristic associated with the different bearer channel exceeds the communication characteristic associated with the bearer channel, similar as described regarding FIG. 5.

At block 1414, the apparatus causes modification of the different bearer channel, similar as described regarding FIG. 5.

Embodiments of the disclosure may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

It is important to note that the steps in the preceding flow diagrams illustrate only some of the possible signaling scenarios and patterns that may be executed by, or within, access point 200. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. If desired, the different functions discussed herein may be performed in a different order and/or concurrently with each other. For example, block 1408 and block 1410 of FIG. 14 may be performed before block 1404 and/or block 1406 of FIG. 14. Furthermore, if desired, one or more of the above-described functions may be optional or may be combined. For example, interaction 706 of FIG. 7 may be optional and/or combined with interaction 708 of FIG. 7. The preceding operational flows have been offered for purposes of example and discussion. Substantial flexibility is provided by access point 200 in that any suitable arrangements, chronologies, configurations, and timing mechanisms may be provided without departing from the teachings of the present disclosure.

It should also be noted that many of the previous discussions may imply a single client-server relationship. In reality, there is a multitude of servers and clients in certain implementations of the present disclosure. Moreover, the present disclosure can readily be extended to apply to intervening servers further upstream in the architecture. Any such permutations, scaling, and configurations are clearly within the broad scope of the present disclosure.

Although the present disclosure has been described in detail with reference to particular arrangements and configurations, these example configurations and arrangements may be changed significantly without departing from the scope of the present disclosure. Additionally, although access point 200 has been illustrated with reference to particular elements and operations that facilitate the communication process, these elements and operations may be replaced by any suitable architecture or process that achieves the intended functionality of access point 200.

Although various aspects of the disclosure are set out in the independent claims, other aspects of the disclosure comprise other combinations of features from the described embodiments and/or the dependent claims with the features of the independent claims, and not solely the combinations explicitly set out in the claims.

It is also noted herein that while the above describes example embodiments of the disclosure, these descriptions should not be viewed in a limiting sense. Rather, there are variations and modifications which may be made without departing from the scope of the present disclosure as defined in the appended claims.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
   at least one processor;
   at least one memory including computer program code, the memory and the computer program code configured to, working with the processor, cause the apparatus to perform at least the following:
   generate one or more test packets by an access point;
   communicate the one or more test packets from the access point to a test server using a broadband communication channel, wherein at least a portion of the broadband communication channel is maintained between the access point and a particular gateway and wherein the particular gateway is at least one of a home node b gateway or a home evolved node b gateway and wherein the test server is located proximate to the particular gateway;
   communicate the one or more test packets from the test server back to the access point using the broadband communication channel;
   measure at least one test communication characteristic based on the communication of the one or more test packets with the test server;

determine at least one performance characteristic of the broadband communication channel maintained between the access point and the particular gateway based, at least in part, on the test communication characteristic;

determine whether the performance characteristic indicates poor performance of the broadband communication channel; and manage access point communication channel utilization based, at least in part, on the performance characteristic indicating poor performance of the broadband communication channel, the access point communication channel utilization pertaining to at least one of: the broadband communication channel maintained between the access point and the particular gateway or at least one user equipment communication channel between the access point and at least one user equipment.

2. The apparatus of claim 1, wherein management of access point communication channel utilization of the broadband communication channel relates to controlling at least one parameter associated with the broadband communication channel.

3. The apparatus of claim 1, wherein management of access point communication channel utilization of the broadband communication channel comprises causation of communication of at least one setting indicating a value of at least one parameter associated with the broadband communication channel.

4. The apparatus of claim 1, wherein management of access point communication channel utilization of the at least one user equipment communication channel between the access point and the at least one user equipment relates to controlling at least one parameter associated with the at least one user equipment communication channel between the access point and the at least one user equipment.

5. The apparatus of claim 1, wherein management of access point communication channel utilization of the at least one user equipment communication channel between the access point and the at least one user equipment relates to controlling allocation of at least one access point resource with respect to the at least one user equipment associated with the at least one user equipment communication channel.

6. The apparatus of claim 5, wherein control of allocation of the access point resource relates to an allocation determination regarding a bearer channel between the at least one user equipment and the access point.

7. The apparatus of claim 6, wherein the allocation determination relates to at least one of a determination to allocate or a determination to preclude allocation.

8. The apparatus of claim 5, wherein the memory further includes computer program instructions that, when executed by the at least one processor, cause the apparatus to perform receipt of an allocation request for allocation of the access point resource.

9. A method comprising:

generating one or more test packets by an access point;

communicating the one or more test packets from the access point to a test server using a broadband communication channel, wherein at least a portion of the broadband communication channel is maintained between the access point and a particular gateway and wherein the particular gateway is at least one of a home node b gateway or a home evolved node b gateway and wherein the test server is located proximate to the particular gateway;

communicating the one or more test packets from the test server back to the access point using the broadband communication channel;

measuring at least one test communication characteristic based on the communication of the one or more test packets with the test server;

determining at least one performance characteristic of the broadband communication channel maintained between the access point and the particular gateway based, at least in part, on the test communication characteristic;

determining whether the performance characteristic indicates poor performance of the broadband communication channel; and managing access point communication channel utilization based, at least in part, on the performance characteristic indicating poor performance of the broadband communication channel, the access point communication channel utilization pertaining to at least one of: the broadband communication channel maintained between the access point and the particular gateway or at least one user equipment communication channel between the access point and at least one user equipment.

10. The method of claim 9, wherein management of access point communication channel utilization of the broadband communication channel relates to controlling at least one parameter associated with the broadband communication channel.

11. The method of claim 9, wherein management of access point communication channel utilization of the broadband communication channel comprises causation of communication of at least one setting indicating a value of at least one parameter associated with the broadband communication channel.

12. The method of claim 9, wherein management of access point communication channel utilization of the at least one user equipment communication channel between the access point and the at least one user equipment relates to controlling at least one parameter associated with the at least one user equipment communication channel between the access point and the at least one user equipment.

13. The method of claim 9, wherein management of access point communication channel utilization of the at least one user equipment communication channel between the access point and the at least one user equipment relates to controlling allocation of at least one access point resource with respect to the at least one user equipment associated with the at least one user equipment communication channel between the access point and the at least one user equipment.

14. The method of claim 13, wherein control of allocation of the access point resource relates to an allocation determination regarding a bearer channel between the at least one user equipment and the access point.

15. At least one non-transitory computer-readable medium encoded with instructions that, when executed by a processor, perform:

generating one or more test packets by an access point;

communicating the one or more test packets from the access point to a test server using a broadband communication channel, wherein at least a portion of the broadband communication channel is maintained between the access point and a particular gateway and wherein the particular gateway is at least one of a home node b gateway or a home evolved node b gateway and wherein the test server is located proximate to the particular gateway;

communicating the one or more test packets from the test server back to the access point using the broadband communication channel;

measuring at least one test communication characteristic based on the communication of the one or more test packets with the test server;

determining at least one performance characteristic of the broadband communication channel maintained between the access point and the particular gateway based, at least in part, on the test communication characteristic;

determining whether the performance characteristic indicates poor performance of the broadband communication channel; and managing access point communication channel utilization based, at least in part, on the performance characteristic indicating poor performance of the broadband communication channel, the access point communication channel utilization pertaining to at least one of: the broadband communication channel maintained between the access point and the particular gateway or at least one user equipment communication channel between the access point and at least one user equipment.

16. The medium of claim 15, wherein management of access point communication channel utilization of the broadband communication channel relates to controlling at least one parameter associated with the broadband communication channel.

17. The medium of claim 15, wherein management of access point communication channel utilization of the at least one user equipment communication channel between the access point and the at least one user equipment relates to controlling at least one parameter associated with the at least one user equipment communication channel between the access point and the at least one user equipment.

* * * * *